United States Patent [19]
Miller

[11] 3,774,250
[45] Nov. 27, 1973

[54] MATTRESS INCLUDING LAMINATED FOAM FABRICS AND THEIR PRODUCTION

[75] Inventor: Philip Miller, Norwalk, Conn.

[73] Assignee: Chemstitch, Inc., New York, N.Y.

[22] Filed: Sept. 11, 1972

[21] Appl. No.: 288,246

[52] U.S. Cl. ........................ 5/345, 5/355, 156/209, 297/DIG. 1
[51] Int. Cl. ........................ A47c 27/22, A47c 27/18
[58] Field of Search ........................... 161/119, 221; 156/228, 71, 209; 5/345, 351, 353, 355; 297/DIG. 1

[56] References Cited
UNITED STATES PATENTS

| | | | |
|---|---|---|---|
| 3,287,749 | 11/1966 | Marsico | 5/355 X |
| 3,109,679 | 11/1963 | Eames | 297/458 |
| 3,294,387 | 12/1966 | Chavannes | 5/351 X |

*Primary Examiner*—Casmir A. Nunberg
*Attorney*—Leonard Horn et al.

[57] ABSTRACT

A mattress comprising a core and a casing, at least the upper surface of said casing comprising a laminate of a fabric and a foam at least about 0.15 inch thick, said fabric being outside and being bonded over substantially its entire underface to said foam, said laminate having a three-dimensional contoured and patterned surface.

The fabric foam laminate is produced by printing adhesive from an engraved roll onto a foam sheet during compression of the sheet and contacting the sheet with a fabric while the adhesive is tacky. The engraving of the roll is deep along some lines and shallow everywhere else for overall bonding. Immediately thereafter the laminate is cooled to quench and set the tacky adhesive so the laminate has relatively deep depressions corresponding to the deep engraving of the roll.

7 Claims, 4 Drawing Figures

MATTRESS INCLUDING LAMINATED FOAM FABRICS AND THEIR PRODUCTION

The present invention relates to novel mattresses and a process for making them, especially the upper faces thereof.

Mattresses in the past were generally made of natural materials filling a casing. Often buttons and stitching were provided to help retain the shape of the structure. Because these mattresses were subject to mildew, sagged and changed in firmness in use they have in part been replaced by foam rubber mattresses. Many individuals, however, are not satisfied with the physical and esthetic properties of foam rubber mattresses and composite structures have been provided, comprising a core and a foam rubber overlay inside a conventional ticking.

This is partially satisfactory but there is the possibility of shifting of the foam rubber overlay relative to the ticking. In addition, the upper surface of the mattress still has the flat shape of regular foam rubber mattresses which permits sliding of objects thereover in contrast with conventional mattresses which have quilted surfaces.

It is accordingly an object of the present invention to provide a mattress having the best properties of foam and other materials and the esthetics and stability of conventional mattresses.

It is another object of the invention to provide a laminated foam-backed fabric which is contoured and patterned and which is especially suited for use in making mattresses.

These and other objects and advantages are realized in accordance with the present invention which relates to an improvement in the standard process for producing a contoured patterned laminate of fabric and foam wherein an adhesive is provided to an engraved rotating roll, said roll is contacted with and resiliently depresses a foam sheet so as to transfer said adhesive to said foam sheet and said foam sheet is contacted with a fabric while said adhesive is tacky so as to unite said foam sheet with said fabric. The improvement of the present invention comprises employing as said adhesive an adhesive which sets at least partially upon cooling, and immediately after contacting said foam sheet and fabric passing the structure in compressed condition about a cooled body so as to quench and set said adhesive, whereby the final laminate at lines corresponding to the engraving of said roll is of substantially the same minimum thickness which it assumes during the resilient depression.

Advantageously the engraved roll, in addition to its engraving, is provided over substantially its entire surface with fine depressions which receive said adhesive and transfer it to said foam sheet so as to effect adhesion of said fabric to said foam sheet over substantially their entire contacting surfaces in addition to the contoured pattern. On occasion the overall bonding may produce minor surface pocking resembling an orange peel and this may be eliminated by passing the laminate over a heated roll with the uppermost portions of the fabric contacting said roll while the lowermost portions are out of contact with said roll, whereby any surface irregularities in said fabric are ironed out without loss of the contoured pattern.

The novel process is especially suited for making mattresses wherein the novel laminate is cut into the approximate shape of a mattress, and is sewn together with a mattress ticking fabric into a mattress-shaped casing, the casing being filled with a mattress body. The resulting mattress has the novel contoured patterned fabric as its top so that it has the beauty and esthetics thereof simultaneously with the luxury of the foam. In addition, if the filling is allergenic or carries odors, such filling is kept away from the users.

For use as a mattress component the foam sheet should have a minimum thickness of at least about 0.15 inch and preferably at least about 0.25 inch. There is no actual upper limit to the thickness since it could be almost as thick aas the mattress itself, i.e., the mattress would include very little other filling, but there is little additional benefit realized when the thickness exceeds about 1 inch or even 0.5 inch.

The noveel process seeks to effect overall bonding of the fabric to the foam. For this purpose the foam must not be so open in structure that the adhesive runs through and no appreciable quantity remains on the foam surface. Alternatively, if the foam is of closed cell structure or other impermeable form, the adhesive will remain on the foam surface for overall bonding but it will not penetrate for depth of pattern. Thus, for the purposes of the present invention the foam must be of limited permeability. One category of suitable foams is open celled foams weighing about 0.5 to 5 and preferably about 1 to 3 pounds per cubic foot. Foams which are inadequately penetrable may be made so by removing surface skins or by increasing the degree of reticulation by a solvent treatment to remove some of the solids and thus, in effect, to enlarge the cells, i.e., increase the pore volume of the foam. The foam is preferably a polyurethane foam although it can be any other foam rubber as produced by a foaming agent or by whipping air into a latex of natural rubber, synthetic rubber such as ethylene-propylene copolymer, butadiene-acrylonitrile-styrene, silicone, and the like. Especially preferred are the polyether polyurethanes weighing about 1.35 pounds per cubic foot, such as Type EGM of Wm. T. Burnett & Co. Inc., Baltimore, Md., or Curon 1133 of Reeves Bros. Inc., Cornelius, N.C.

The adhesive which is applied to the foam may be any of those employed heretofore for laminating foam to fabric, including synthetic rubber latices, urethane adhesives, epoxy resins, and the like. Several suitable adhesives are shown in my U.S. Pat. Nos. 3,070,476 and 3,257,263, the disclosures of which are incorporated herein by reference. The adhesive is necessarily one which can set up to tacky state relatively quickly. This can be accomplished by applying the adhesive in relatively flowable liquid form. If the adhesive is dissolved, it is rendered tacky by removal of solvent by passage through an oven, over or under a heat source such as infrared or a hot roll, or the like. If the adhesive is a melt it will increase in tackiness upon cooling; in either event it will ultimately set by cooling. In addition to adhesive latices and solutions, melts such as polyesters may be satisfactorily employed.

The adhesive may be pigmented to provide a decorative effect as described hereinbelow. Such pigmentation also serves to inhibit degradation of the foam therebelow by acting as a light shield. Also, by its mere physical presence the pigment in the adhesive layer between fabric and foam will prevent color changes being visible from the fabric face in the event of yellowing of the foam.

The adhesive is applied to the foam by an engraved roller which has depressions corresponding to the pattern to be printed. The depth of the depressions will vary in dependence upon the thickness of the foam being processed and the depth of contour desired. In addition, the nature of the adhesive will affect the requisite depth of depression. Where the adhesive is relatively dilute the depressions will have to be deeper to hold a given amount of binder. Generally the depressions for print lines will be about 0.005 to 0.1 and preferably about 0.01 to 0.05 inch. In addition to the foregoing it is desirable to provide fine lines of engraving over substantially the entire surface of the engraved roller to provide little reservoirs of adhesive after the engraved roller is wiped with a doctor blade to remove excess adhesives. These reservoirs serve to effect the overall bonding better than if the roll surface were smooth and the doctor blade were spaced therefrom to leave a film of adhesive. Such fine lines are generally about 0.001 to 0.01 and preferably about 0.002 to 0.005 inch in depth. These lines may be substantially continuous or discontinuous, i.e., in the nature of dots and their width and spacing may be varied, e.g. about 50 to 200 and preferably about 100 to 150 per inch.

The foam with the adhesive thereon is generally subjected to a rapid drying and/or partial cure as by passage through an oven, although this will depend upon the nature and amount of solvent, if present, the nature of the adhesive, and the like. The foam then is contacted with a suitable fabric under conditions which render the adhesive tacky if it is still not tacky from before. This can be by heating the foam or by passing the foam and fabric through a hot zone, although preferably it is by heating the fabric as by first passing it over a hot roll before contacting the foam and adhesive. The fabric may be of any construction, e.g. woven, knit or even non-woven, and may be composed of any fibrous material such as polyester, nylon, acrylic, polyolefin, acetate, saran, vinyon, rayon, silk, cotton, wool, or the like. It may be made of staple fibers or of continuous filaments of any denier and construction. Depending upon its openness and transluscency, controlled to some extent by the fiber geometry and content of delustrant, the color of the adhesive will be somewhat visible therethrough and where the fabric surface is deeply depressed the lines will be relatively deeply colored. Thus, proper selection of fabric color or pattern plus pigmentation of the adhesive will permit ornamentation in addition to the other visual and physical effects.

The laminate of fabric, tacky adhesive and foam is squeezed to ensure contact between fabric and the depressions in the foam. Because the foam and adhesive are warm, there is a tendency for the foam to return resiliently to its initial uncompressed state and the tack of the adhesive imparts only limited resistance to such restoration. It has accordingly proved desirable to quech the laminate so as to eliminate the tack of the adhesive, i.e., to set it. To this end, the laminate is passed over a cold surface, e.g. about a cooled quench roll, so that the laminate is fully established in patterrn and contour. The quench may sometimes produce a slight puckering or orange peel effect in the fabric surface, depending upon the quench conditions and the nature of the fabric, but this can be overcome by passage of the laminate over a hot surface which contacts only the top of the fabric at its most raised locations so as to iron away the pucker without delamination.

The laminated fabric is usually rolled up and subsequently cut into predetermined sizes and sewn into a mattress casing with the laminate as the top surface and, optionally, as the bottom surface and/or the sides as well. The casing is thereafter filled with a suitably shaped mattress core which may comprise a foam rubber of the same or different firmness compared to the laminate, a fiber-filled core, springs, horsehair, or the like. The opening is then sealed.

In accordance with one preferred aspect of the invention, the mattress is fire-resistant and this can be achieved without special after-treatment by selection of the appropriate fabric, adhesive, foam and/or mattress core. Thus, vinyon and/or modacrylic fabrics are especially useful because of their natural fire resistance. Similarly, polyester adhesives made of chlorinated or brominated dihydric alcohols and/or dicarboxylic acids are especially suitable. Alternatively, the components may be treated initially before joinder to render them fire resistant, e.g. the foam surface may be sprayed, retardants may be added to the adhesive or the fabric may be flame-proofed by passage through a chemical bath. The fire resistance is an obvious safeguard against fires started from falling cigarettes and the like.

The invention will be further described with reference to the accompanying drawing wherein.

Figure 1:
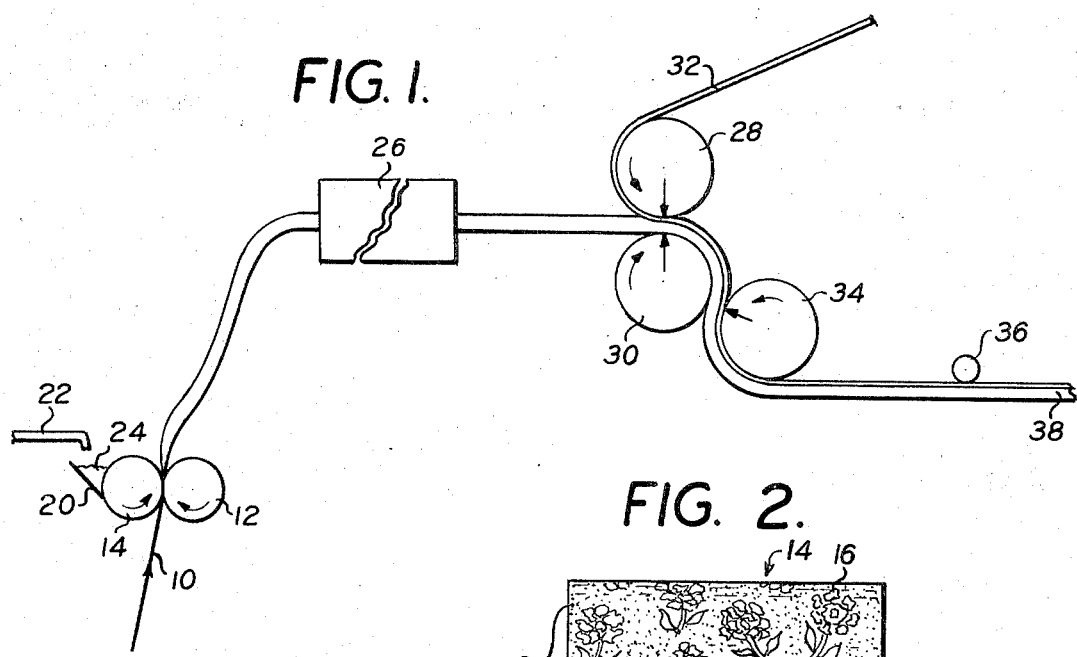
FIG. 1 is a schematic fow sheet of the process for making a laminated fabric in accordance with the invention.
Figure 2:
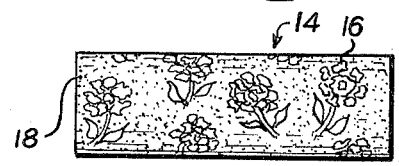
FIG. 2 is a lateral elevation of an engraved roll for applying adhesive.

Referring now more particularly to the drawing, in FIG. 1 there is shown a continuous sheet of foam 10 of a width equal to, or a multiple of, a mattress width. The foam 10 is pulled through a nip defined between rotating rolls 12 and 14. The roll 14 has a surface as shown in FIG. 2 comprising relatively deeply engraved lines 16 and shallow lines or dots of engraving 18. Returning to FIG. 1, a doctor blade 20 is disposed in association with roll 14. An adhesive latex or solution is supplied at 22 across the width of roll 14, forming a pool 24 bounded by blade 20. Rotation past blade 20 wipes the adhesive down to leave a film of predetermined thickness or, alternatively, wipes the surface of roll 14 clean so as to leave adhesive only in depressions 16 and 18. When the adhesive-carrying foam 10 passes through the nip, the adhesive is pushed into the body of the foam to a depth dependent upon the depth of the lines of engraving 16 and 18 in the surface of roll 14.

The foam sheet next passes to oven 26 which effects curing of the adhesive; oven 26 is not always necessary, depending upon the characteristics of the adhesive. The foam leaving oven 26 may be slightly tacky on its upper surface or may be dry to the touch. It passes through the nip defined by a hot rotating roll 28 and a roll 30. A fabric 32 also passes through the nip after sufficient contact with the surface of hot roll 28 to be heated thereby. Advantageously, roll 28 is coated with a non-stick surface such as Teflon polytetrafluorethylene whereas roll 30 is rubber surfaced. The hot fabric 32 contacts the surface of foam sheet 10 which carries the adhesive and, even if the adhesive is non-tacky previously, the heat of the fabric softens the adhesive so that it is tackified during passage through the nip and bonds the fabric to the foam overall. Because the adhesive is softened, however, its resistance to return of the foam to a flat condition is diminished. To prevent such return, therefore, the laminate is passed through a nip including, and/or about, a cooled quench roll 34 which sets the adhesive and thus establishes the contour. Thereafter the sandwich passes below a stationary hot bar 36 which brushes lightly over the top to achieve an ironing action but not heavily enough to reduce the texture significantly. Then the laminated fabric 38 is collected, preferably as a roll (not shown).

Figure 3:
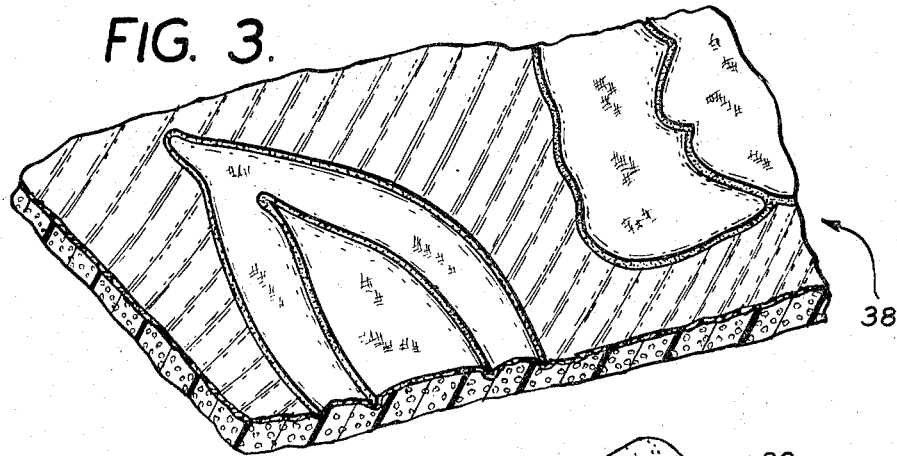
FIG. 3 is a perspective view of a piece of laminated fabric in accordance with the invention.

In FIG. 3 a portion of the fabric 38 is shown in approximately full size. The depressions corresponding to engraved lines 16 are readily apparent. Many exceed 0.10 inch in depth.

Figure 4:
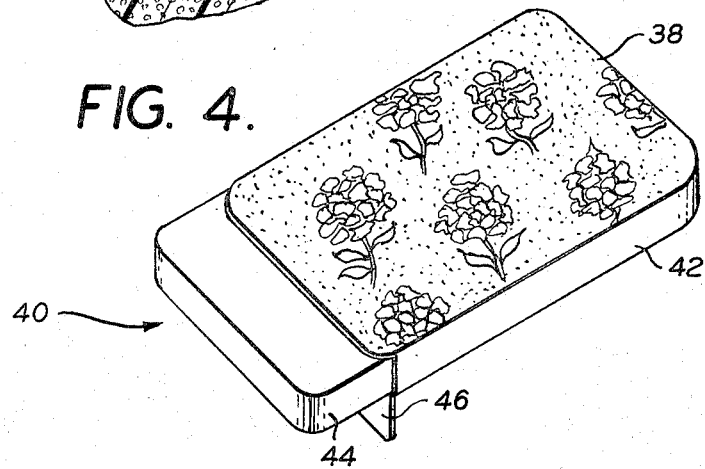
FIG. 4 is a perspective view of a mattress.

In FIG. 4 there is shown a mattress 40 at an intermediate stage in its manufacture. The upper surface (and possibly the lower as well) comprises a generally rectangular section of laminated fabric 38 with the fabric uppermost. Mattress ticking fabric 42 is sewn to 38 so as to form therewith an open-ended casing or envelope which receives a mattress core 44. After the core 44 is fully inserted, the flap 46 is sewn so as to fully close the casing.

The invention will be further described in the following illustrative examples, wherein all parts by weight unless otherwise expressed.

EXAMPLE 1

Using an apparatus as shown in FIG. 1, a polyurethane foam 0.25 inch thick and 40 inches wide having a density of 1.35 pounds per cubic foot and sold by Reeves Bros. Inc. as Curon 1133, is passed at the rate of 30 feet per minute between the nip defined between metal rolls 12 and 14. The adhesive is an aqueous emulsion of the following composition:

| Ingredients | Parts by weight |
| --- | --- |
| Linear polyester resin (Goodyear Vitel 207) | 20 |
| Polyurethane resin (Witco Witcobond B-1) | 18 |
| Polyisocyanate (DuPont RC-805) | 7.4 |
| Organotin catalyst (M & T T-12) | 0.1 |
| Cellosolve acetate | 2.5 |
| Methylethylketone | 25.0 |
| Toluene | 28.0 |
| Carbon black (Microlith Black C-T) | 2 |

The surface of roll 14 is provided with lines 16 engraved differing amounts up to a maximum of 0.03 inch; over the rest of its surface it is provided with dippled engraving to a depth of 0.003 inch. After a residence of 30 seconds in oven 26 supplied with hot air at 250° F. the foam carries 0.16 ounce of added solids, including the adhesives and pigment, per square yard of foam. Roll 28 is heated to a surface temperature of 300° F. and is supplied with a pale blue nylon tricot fabric having a weight of 3 ounces per square yard. The surface temperature of quench roll 34 is 70° F. Bar 36 has a temperature of 250° F. The fabric 38 is cut into 74 inch lengths to provide an inch of overlap at each end, and is sewn as top, bottom and sides into a casing 6 inches high. The casing is filled with a horsehair core 5.5 inches thick and sewn closed to give a firm lightweight reversible mattress having soft outer surfaces with a pleasant three dimensional contour which includes variations of color coincident with the depressed lines, some of which are 0.15 inch deep.

EXAMPLE 2

Example 1 is repeated except that quench roll 34 is removed. The resulting laminate has much shallower contours and the depressions are non-uniform and irregular.

It will be appreciated that the instant specification and examples are set forth by way of illustration and not limitation, and that various modifications and changes may be made without departing from the spirit and scope of the present invention.

What is claimed is:

1. A mattress comprising a core and a casing, at least the upper surface of said casing comprising a laminate of a fabric and a foam at least about 0.15 inch thick, said fabric being outside and being bonded over substantially its entire undersurface to said foam, said laminate having a three-dimensional contoured and patterned surface, the foam of the casing directly contacting the core and friction therebetween preventing relative shifting.

2. A mattress according to claim 1 wherein said laminate is about 0.25 to 1 inch thick and has depressions in its outside face of at least about 0.1 inch.

3. The process of claim 1, wherein said roll in addition to said engraving is provided over substantially its entire surface with fine depressions which receive said adhesive and transfer it to said foam sheet so as to effect adhesion to said fabric to said foam sheet over substantially their entire contacting surfaces in addition to the contoured pattern.

4. The process of claim 3, including the further step of passing said laminate over a heated roll with the uppermost portions of the fabric contacting said roll while the lowermost portions are out of contact with said roll, whereby any surface irregularities in said fabric are ironed out without loss of the contoured pattern.

5. The process of claim 3, wherein the foam sheet has a minimum thickness of about 0.15 inch and a density of about 0.5 to 5 pounds per cubic foot.

6. A mattress according to claim 1 wherein both the upper and lower surfaces of said casing comprise said laminate, the mattress thus having the same appearance when turned.

7. The process for the production of a mattress comprising a core and a contoured patterned casing, comprising supplying to an engraved rotating roll an adhesive which sets at least partially upon cooling, contacting said roll with a foam sheet so as resiliently to depress said sheet and to transfer said adhesive to said foam sheet, contacting said foam sheet with a fabric while said adhesive is tacky so as to unite said foam sheet with said fabric into a laminate, immediately thereafter passing the laminate about a cooled body so as to quench and set said adhesive, whereby the laminate at lines corresponding to the engraving of said roll is of substantially the same minimum thickness which it assumes during the resilient depression, cutting said laminate into the approximate shape of a mattress, sewing said cut laminate into a mattress-shaped casing with the fabric of said laminate outermost, and filling said casing with a mattress core, the resulting mattress having a contoured patterned upper face, the foam of the casing directly contacting the core and friction therebetween preventing relative shifting.

* * * * *